United States Patent
Gatchell et al.

(10) Patent No.: US 10,521,442 B1
(45) Date of Patent: Dec. 31, 2019

(54) HIERARCHICAL VALUE-BASED GOVERNANCE ARCHITECTURE FOR ENTERPRISE DATA ASSETS

(71) Applicant: EMC IP Holding Company LLC, Hopkinton, MA (US)

(72) Inventors: Stephen Gatchell, Marblehead, MA (US); Barbara Latulippe, Bradford, MA (US); Anand Singh, Westborough, MA (US); Perry Davis, Westford, MA (US); David Dionisio, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 525 days.

(21) Appl. No.: 15/268,046

(22) Filed: Sep. 16, 2016

(51) Int. Cl.
*G06F 16/20* (2019.01)
*G06F 16/2458* (2019.01)
(Continued)

(52) U.S. Cl.
CPC ...... *G06F 16/2474* (2019.01); *G06F 16/2365* (2019.01); *G06F 16/282* (2019.01); *G06Q 40/06* (2013.01)

(58) Field of Classification Search
CPC ......... G06F 17/30548; G06F 17/30371; G06F 17/30589; G06F 16/2474; G06F 16/282; G06F 16/2365; G06Q 40/06
See application file for complete search history.

(56) References Cited

U.S. PATENT DOCUMENTS

| 8,838,556 B1 | 9/2014 | Reiner et al. |
| 9,031,992 B1 * | 5/2015 | Florissi ............... G06F 17/30 707/794 |

(Continued)

FOREIGN PATENT DOCUMENTS

WO 2011130128 A1 10/2011

OTHER PUBLICATIONS

U.S. Appl. No. 14/487,520 filed in the name of Nihar Nanda et al. filed Sep. 16, 2014 and entitled "Data Set Virtual Neighborhood Characterization, Provisioning and Access."
E.J. Richardson et al., "Meta4: A Web Application for Sharing and Annotating Metagenomic Gene Predictions Using Web Services," Frontiers in Genetics, Methods Article, Sep. 5, 2013, pp. 1-6, vol. 4, Article 168.

(Continued)

*Primary Examiner* — Joshua Bullock
*Assistant Examiner* — Tiffany Thuy Bui
(74) *Attorney, Agent, or Firm* — Ryan, Mason & Lewis, LLP

(57) ABSTRACT

An apparatus in one embodiment comprises at least one processing platform accessible to a plurality of user devices over at least one network. The processing platform implements a hierarchical value-based governance system for data assets of an enterprise. The hierarchical value-based governance system comprises a data asset governance controller, a technical metadata hub, a business metadata hub and a data asset catalog. The data asset catalog is coupled to the technical metadata hub and the business metadata hub and provides integrated technical metadata and business metadata for each of a plurality of the data assets of the enterprise. The data asset governance controller is configured to generate analytics actions for one or more analytics workspaces based at least in part on the integrated technical metadata and business metadata of the data asset catalog. The analytics actions may comprise visualizations providing actionable insights into the corresponding data assets.

20 Claims, 8 Drawing Sheets

(51) Int. Cl.
*G06Q 40/06* (2012.01)
*G06F 16/28* (2019.01)
*G06F 16/23* (2019.01)

(56) References Cited

U.S. PATENT DOCUMENTS

| | | | |
|---|---|---|---|
| 9,141,908 B1 | 9/2015 | Reiner et al. | |
| 2002/0133368 A1* | 9/2002 | Strutt | G06F 17/30592 705/7.11 |
| 2010/0114899 A1 | 5/2010 | Guha et al. | |
| 2011/0066590 A1 | 3/2011 | Chang et al. | |
| 2011/0077973 A1* | 3/2011 | Breitenstein | G06Q 10/10 705/3 |
| 2012/0136806 A1 | 5/2012 | Anderson et al. | |
| 2013/0138603 A1* | 5/2013 | Chilakamarri | G06Q 10/00 707/609 |
| 2014/0156806 A1* | 6/2014 | Karpistsenko | G06F 16/25 709/219 |
| 2014/0258250 A1 | 9/2014 | Ge et al. | |
| 2014/0298207 A1* | 10/2014 | Ittah | G06Q 10/00 715/753 |
| 2014/0310231 A1* | 10/2014 | Sampathkumaran | G06F 17/30563 707/602 |
| 2014/0358975 A1 | 12/2014 | Nivargi et al. | |
| 2015/0281356 A1 | 10/2015 | Maturana et al. | |
| 2015/0301861 A1* | 10/2015 | LaChiusa | G06F 11/3072 718/102 |
| 2016/0019272 A1* | 1/2016 | Liu | G06F 17/30569 707/756 |
| 2016/0217419 A1* | 7/2016 | Majumdar | G06Q 10/10 |
| 2016/0253340 A1* | 9/2016 | Barth | G06F 17/30082 707/756 |
| 2017/0300712 A1* | 10/2017 | Timmerman | G06F 21/6227 |
| 2017/0316050 A1* | 11/2017 | Hill | G06F 16/2428 |
| 2018/0084073 A1* | 3/2018 | Walsh | H04L 67/2819 |

OTHER PUBLICATIONS ey.com, "Forensic Data Analytics: Globally Integrated Compliance Review, Litigation Support and Investigative Services," http://www.ey.com/Publication/vwLUAssets/EY-Forensic-data-analytics/$FILE/EY-Forensic-data-analytics.pdf, 2013, 12 pages.

Philip Russom, "Active Data Archiving: For Big Data, Compliance, and Analytics," TDWI Research, TDWI Checklist Report, http://rainstor.com/2013_new/wp-content/uploads/2014/11/WP_TDWI_ChecklistReport_Rainstor_Active-Data-Archiving.pdf, May 2014, 8 pages.

Booz Allen Hamilton, "Data Lake-Based Approaches to Regulatory-Driven Technology Challenges: How a Data Lake Approach Improves Accuracy and Cost Effectiveness in the Extract, Transform, and Load Process for Business and Regulatory Purposes," http://www.boozallen.com/content/dam/boozallen/media/file/data-lake-based-approaches-to-regulatory-driven-tech-changes.pdf, Apr. 2013, 6 pages.

Mike Ferguson, "Architecting a Big Data Platform for Analytics," White Paper, Intelligent Business Strategies, Oct. 2012, 36 pages.

Joe Nicholson, "Beyond BI: Big Data Analytic Use Cases," Datameer, Aug. 22, 2013, 7 pages.

U.S. Appl. No. 14/614,011 filed in the name of David Stephen Reiner et al. filed Feb. 4, 2015 and entitled "Integrating Compliance and Analytic Environments Through Data Lake Cross Currents."

U.S. Appl. No. 15/074,597 filed in the name of David Stephen Reiner et al. filed Mar. 18, 2016 and entitled "Data Set Discovery Engine Comprising Relativistic Retriever."

U.S. Appl. No. 15/088,029 filed in the name of David Reiner et al. filed Mar. 31, 2016 and entitled "A Registration Framework for an Analytics Platform."

U.S. Appl. No. 15/088,085 filed in the name of David Reiner et al. filed Mar. 31, 2016 and entitled "Data Governance Through Policies and Attributes."

U.S. Appl. No. 15/197,109 filed in the name of Nihar Nanda et al. filed Jun. 29, 2016 and entitled "Analytics Platform and Associated Controller for Automated Deployment of Analytics Workspaces."

* cited by examiner

US 10,521,442 B1

HIERARCHICAL VALUE-BASED GOVERNANCE ARCHITECTURE FOR ENTERPRISE DATA ASSETS

FIELD

The field relates generally to information processing systems, and more particularly to techniques for implementing data governance and related analytics functionality in information processing systems.

BACKGROUND

Many different types of information processing systems are configured to incorporate data analytics functionality. For example, numerous systems configured to perform "Big Data" analytics are known in the art. However, issues can arise in some of these systems relating to governance of data from multiple distinct data sources within a given enterprise. Such issues can result in analytics performance limitations that can make it unduly difficult to obtain valuable insights from enterprise data assets.

SUMMARY

Illustrative embodiments of the present invention provide a value-based governance architecture for enterprise data assets.

In one embodiment, an apparatus comprises at least one processing platform accessible to a plurality of user devices over at least one network. The processing platform implements a hierarchical value-based governance system for data assets of an enterprise. The hierarchical value-based governance system comprises a data asset governance controller, a technical metadata hub, a business metadata hub and a data asset catalog. The data asset catalog is coupled to the technical metadata hub and the business metadata hub and provides integrated technical metadata and business metadata for each of a plurality of the data assets of the enterprise. The data asset governance controller is configured to generate analytics actions for one or more analytics workspaces based at least in part on the integrated technical metadata and business metadata of the data asset catalog. The analytics actions generated by the data asset governance controller may comprise one or more visualizations providing actionable insights into the corresponding data assets.

At least portions of the business metadata in some embodiments may be based at least in part on value-based data asset assessments received from corresponding data asset analysts, experts, stewards or other users associated with respective ones of the user devices via at least one user interface of the business metadata hub.

In some embodiments, the hierarchical value-based governance system comprises a multi-level hierarchical architecture having at a lower level of the hierarchical architecture an ingestion level configured to ingest data assets into at least one data lake of the enterprise and at an upper level of the hierarchical architecture an action level configured to generate the analytics actions. The multi-level hierarchical architecture of the system may additionally comprise one or more intermediate levels including at least one of a function generation level and an analytical results model level. The analytical results model level may be illustratively configured to facilitate utilization of the data assets in one or more analytics workspaces by providing at least one of verification and trust assurance for the data assets in accordance with at least one analytical results model.

One or more of the illustrative embodiments provide significant advantages relative to conventional arrangements. For example, a given such embodiment can facilitate highly efficient and effective utilization of available enterprise data assets in a wide variety of different automated analytics-based workflows. Governance issues relating to data assets from multiple distinct data sources are handled in an automated manner in accordance with a value-based hierarchical architecture thereby permitting substantially improved analytics performance. Such arrangements allow business value propositions to be more readily identified and implemented utilizing the data assets of a given enterprise.

These and other illustrative embodiments include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
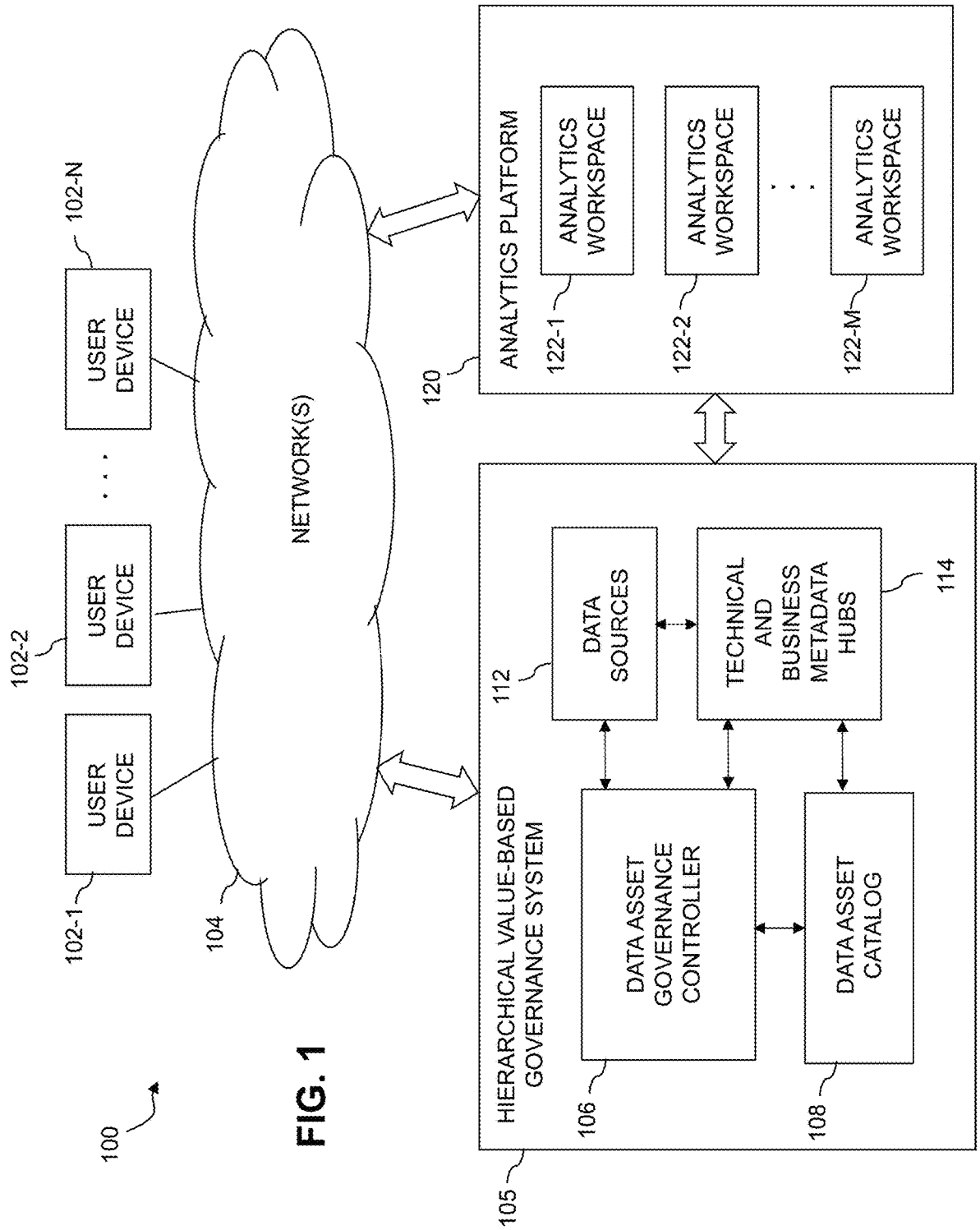
FIG. 1 shows an information processing system implementing a value-based governance architecture for enterprise data assets in an illustrative embodiment.

FIG. 1 shows an information processing system 100 configured in accordance with an illustrative embodiment of the present invention. The information processing system 100 is assumed to be built on at least one processing platform and provides value-based governance functionality for data assets of an enterprise. In this embodiment, the system 100 more particularly comprises a plurality of user devices 102-1, 102-2, . . . 102-N coupled to a network 104. Also coupled to the network 104 is a hierarchical value-based governance system 105. The hierarchical value-based governance system 105 comprises a data asset governance controller 106, a data asset catalog 108, data sources 112, and technical and business metadata hubs 114. The data asset catalog 108 interacts with the technical and business metadata hubs 114 in order to provide integrated technical metadata and business metadata for each of a plurality of the data assets of the enterprise. The hierarchical value-based governance system 105 is accessible to the user devices 102 over the network 104.

The term "enterprise" as used herein is intended to be broadly construed, and may comprise, for example, a business or other type of organization that performs analytics utilizing data assets.

At least a subset of the data assets of the enterprise comprise data ingested into at least one data lake of the enterprise. A given such data lake in some embodiments comprises a business data lake or BDL.

The term "data lake" as utilized herein is intended to be broadly construed so as to encompass, for example, a data repository that stores data without optimization for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes or with predetermined data interrelationships.

Moreover, a data lake in some embodiments can provide the ability to deal with flexible combinations of a wide variety of different types of data in different analytics contexts. Examples of analytics contexts that may be supported by one or more analytics platforms in illustrative embodiments include financial services, telecommunications, health care, life sciences, manufacturing, energy, transportation, entertainment, data center security, sensor data processing and numerous others.

Data lakes in some embodiments provide the ability for the users to store different types of data in various data containers of their choosing. The data containers may be provided in multiple types, formats and storage capabilities. A given data scientist or other user may prefer to utilize one type of data container over another based on familiarity, standards, type of analytics, type of models and processing capabilities.

Also accessible to the user devices 102 over the network 104 is an analytics platform 120 that includes a plurality of analytics workspaces 122-1, 122-2, ... 122-M. The analytics platform 120 is directly coupled to the hierarchical value-based governance system 105 but can additionally or alternatively communicate with the system 105 over the network 104.

The data asset governance controller 106 is configured to generate analytics actions for one or more of the analytics workspaces 122 based at least in part on the integrated technical metadata and business metadata of the data asset catalog 108. The analytics actions generated by the data asset governance controller 106 illustratively comprise one or more visualizations providing actionable insights into the corresponding data assets.

Although the analytics workspaces 122 in this embodiment are implemented in an analytics platform 120 that is separate from the hierarchical value-based governance system 105, other embodiments can incorporate at least a portion of one or more of the analytics workspaces 122 into the system 105. In addition, although only a single analytics platform 120 is shown in the FIG. 1 embodiment, other embodiments can include multiple analytics platforms each comprising at least one analytics workspace.

The user devices 102 can comprise, for example, desktop, laptop or tablet computers, mobile telephones, or other types of processing devices capable of communicating with at least one of the hierarchical value-based governance system 105 and the analytics platform 120 over the network 104.

The "users" in a given embodiment may refer, for example, to respective ones of the user devices 102, although the term "user" as utilized herein is intended to be broadly construed so as to encompass numerous other arrangements of human, hardware, software or firmware entities, as well as combinations of such entities. Accordingly, a user may be a human user, or a software entity such as an application, or any of a wide variety of other entity arrangements.

The network 104 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

In some embodiments, the technical metadata hub is coupled to the business metadata hub via an integration interface providing access to one or more query application programming interfaces (APIs) of the technical metadata hub. An example of an embodiment of this type will be described below in conjunction with FIG. 4.

The technical metadata hub of the set of metadata hubs 114 illustratively comprises a technical metadata store, and the business metadata hub of the set of metadata hubs 114 illustratively comprises a business metadata store. The term "metadata store" in this context refers to at least a portion of a storage system configured to storing particular types of metadata.

At least portions of the technical metadata are obtained by automated scanning of the data assets of the enterprise.

The technical metadata for a given one of the data assets of the enterprise illustratively comprises physical attributes of the given data asset including location, creator, lineage and contents of the given data asset.

At least portions of the business metadata are based at least in part on value-based data asset assessments received from corresponding data asset users associated with respective ones of the user devices 102 via at least one user interface of the business metadata hub.

The business metadata for a given one of the data assets illustratively comprises semantic and logical attributes of the given data asset including business definition, usage details, business controls and business owner of the given data asset.

The hierarchical value-based governance system 105 in the present embodiment is assumed to comprise a multi-level hierarchical architecture having at a lower level of the hierarchical architecture an ingestion level configured to ingest data assets into at least one data lake from data sources 112 of the enterprise and at an upper level of the hierarchical architecture an action level configured to generate the above-noted analytics actions for one or more of the analytics workspaces 122.

The integrated technical metadata and business metadata for a given one of the data assets of the enterprise illustratively provides traceability of the given data asset through the multiple levels of the hierarchical architecture of the hierarchical value-based governance system 105 from a corresponding analytics action at an upper one of the levels back to its data source at a lower one of the levels.

The multi-level hierarchical architecture in some embodiments may further comprise one or more intermediate levels including at least one of a function generation level and an analytical results model level. For example, the analytical results model level is illustratively configured to facilitate utilization of the data assets in the analytics workspaces by providing at least one of verification and trust assurance for the data assets in accordance with at least one analytical results model.

A more detailed example of a multi-level hierarchical architecture of this type will be described below in conjunction with FIG. 3.

The analytics platform 120 may comprise a distributed analytics platform comprising multiple interconnected processing nodes. For example, a given analytics platform in some embodiments is implemented using a plurality of distributed processing nodes, illustratively comprising cloud compute nodes and cloud storage nodes of cloud infrastructure, although numerous other arrangements are possible.

As a more particular example, an illustrative distributed implementation of the analytics platform 120 in one embodiment is configured to perform analytics operations in accordance with a processing framework supported by an Apache Hadoop YARN ("Yet Another Resource Negotiator") cluster. Examples of frameworks supported by the Hadoop YARN platform include MapReduce, Spark, Hive, MPI and numerous others. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein.

In some embodiments, a plurality of processing nodes collectively implement at least a portion of a distributed analytics platform that is more particularly in the form of a multi-cluster distributed data processing platform. Such a platform may comprise, for example, a plurality of potentially geographically-distributed YARN clusters each comprising a corresponding cluster of distributed processing nodes.

A wide variety of other types of processing nodes can be used in other embodiments. For example, additional or alternative types of processing node functionality that may be incorporated in at least a subset of the processing nodes of an information processing system in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

The hierarchical value-based governance system 105 of information processing system 100 is illustratively configured to provide an information marketplace framework for managing the data assets of an enterprise in a manner that facilitates the extraction of useful and otherwise actionable insights from the data assets while also implementing agile controls for development utilization. For example, integrating technical metadata obtained by automated scanning with business metadata provides end-to-end traceability from a visualization at a high level of a hierarchical value-based governance architecture to corresponding data sources at a low level of the architecture. Such arrangements provide valuable tools to data analysts, data scientists, data stewards and other users, facilitating information discovery, consumption, insight and collaboration, leading to enhanced monetization of data assets for the enterprise. Accordingly, an enterprise can more readily focus their governance resources on data assets which have high value, are scalable to accelerate growth, can improve product reliability or can be used to recommend customer prescriptive actions.

In some embodiments, value-based governance is implemented by the data asset governance controller 106 in accordance with an agile model which provides an appropriate level of governance as defined by a stakeholder community and value-based consumption to the enterprise. The hierarchical value-based governance system 105 recognizes that not all data is of equal value and therefore allows the stakeholder community to determine data value, consumption utilization and data sharing parameters. For example, this paradigm can shift data governance for a given enterprise from an internal focus to a focus on what is relevant to govern based on an external customer experience.

The data asset catalog 108 is illustratively configured to ensure that data assets can be easily searched and consumed utilizing robust metadata models that clearly describe and classify the data assets, thereby enabling self-service discovery of critical data assets by data analysts, data scientists, data stewards and other users.

Governance workflows and processes generated within the hierarchical value-based governance system 105 provide numerous advantages within the enterprise. For example, such workflows and processes address the challenges faced by data teams in terms of obtaining efficient peer-to-peer access to data assets, onboarding new data assets, obtaining support for new business value cases, promoting data assets to enterprise supported solutions, and understanding data asset corporate policies.

Additionally or alternatively, one or more illustrative embodiments are advantageously configured to realize actionable monetization with visibility to business value cases, to enable data sharing and reuse through analytical models, to provide rapid search capabilities by cataloging asset artifacts and attributes, to accelerate information insight by implementing a business context view in terms that are meaningful to business customers, to verify quality and traceability by applying data quality on critical data elements, to drive actionable governance with asset workflow tasks and voting, and to expose new asset creation. These and numerous other types and combinations of value-based governance functionality and features can be provided in other embodiments.

It is to be appreciated that the particular arrangement of system elements shown in FIG. 1 is presented for purposes of illustration only, and that other arrangements of additional or alternative elements can be used in other embodiments. For example, numerous alternative information processing system configurations can be used to implement hierarchical value-based governance functionality for analytics workspaces of one or more analytics platforms as disclosed herein.

The operation of the system 100 will now be described in further detail with reference to the flow diagram of FIG. 2. The process as shown includes steps 200, 202 and 204, and is suitable for use in the system 100 but is more generally applicable to other types of information processing systems.

In step 200, technical metadata and business metadata relating to data assets of an enterprise are received. For example, with reference to the hierarchical value-based governance system 105 of the FIG. 1 embodiment, such metadata can be received in at least one of the data asset governance controller 106 and data asset catalog 108 from the set of metadata hubs 114. At least portions of the business metadata are based at least in part on value-based data asset assessments received from corresponding data asset users.

The hierarchical value-based governance system 105 is further assumed to comprise a multi-level hierarchical architecture having at a lower level of the hierarchical architecture an ingestion level configured to ingest data assets into at least one data lake of the enterprise and at an upper level of the hierarchical architecture an action level configured to generate analytics actions.

In step 202, a data asset catalog is configured to provide integrated technical metadata and business metadata for each of at least a subset of the data assets of the enterprise. For example, the integrated technical metadata and business metadata for a given one of the data assets of the enterprise illustratively provides traceability of the given data asset through the multiple levels of the hierarchical architecture of the hierarchical value-based governance system 105 from a corresponding analytics action at an upper one of the levels back to its data source at a lower one of the levels.

In step 204, analytics actions are generated for one or more analytics workspaces based at least in part on the integrated technical metadata and business metadata of the data asset catalog. For example, in the FIG. 1 embodiment, the data asset governance controller 106 is illustratively configured to generate analytics actions for one or more of the analytics workspaces 122 based at least in part on the integrated technical metadata and business metadata of the data asset catalog 108. The analytics actions generated by the data asset governance controller 106 illustratively comprise one or more visualizations providing actionable insights into the corresponding data assets.

In some embodiments, a given one of the analytics workspaces 122 is configured to perform Big Data analytics based at least in part on information supplied by the hierarchical value-based governance system 105. Additional details regarding examples of Big Data analytics processes that can be implemented in illustrative embodiments of the present invention are described in U.S. Pat. No. 9,031,992, entitled "Analyzing Big Data," which is commonly assigned herewith and incorporated by reference herein.

Such an analytics workspace is illustratively configured to leverage one or more frameworks supported by Hadoop YARN, such as MapReduce, Spark, Hive, MPI and numerous others, to support distributed computations relating to enterprise data assets and associated integrated technical and business metadata.

Figure 2:
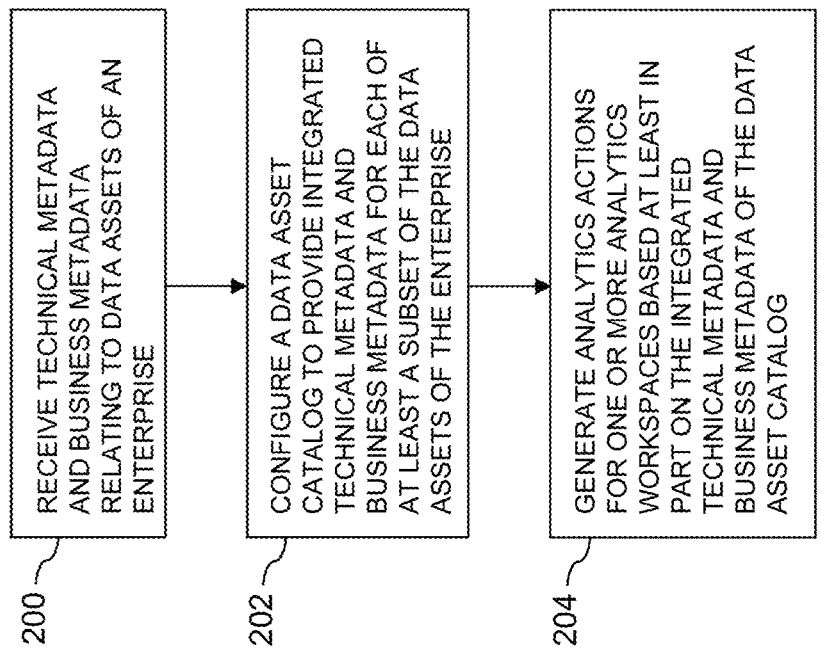
FIG. 2 is a flow diagram of an example process of value-based governance for enterprise data assets in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing hierarchical value-based governance functionality for analytics workspaces of at least one analytics platform. For example, the ordering of the process steps may be varied in other embodiments, or certain steps may be performed concurrently with one another rather than serially. Also, one or more of the process steps may be repeated periodically for providing value-based governance functionality for different sets of enterprise data assets from respective different sets of data sources, or multiple instances of the process can be performed in parallel with one another for such different sets of enterprise data assets.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3 through 6.

Figure 3:
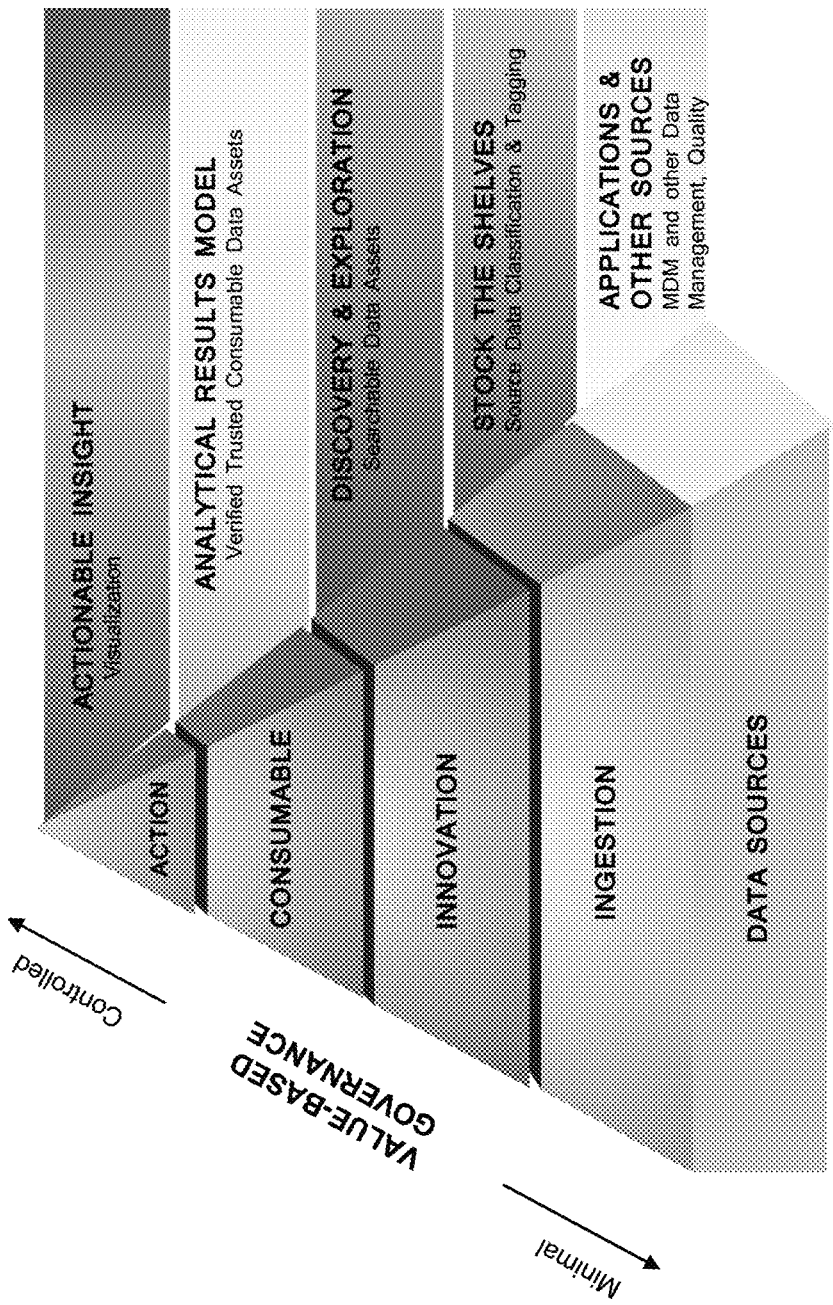
FIG. 3 shows an example set of hierarchical levels of a value-based governance architecture in an illustrative embodiment.

Referring initially to FIG. 3, an example set of hierarchical levels of a value-based governance architecture in an illustrative embodiment is shown. This illustrative value-based governance architecture can be used in the hierarchical value-based governance system 105 of FIG. 1, although it is to be appreciated that other architectures having different arrangements of levels can be used in other embodiments.

The value-based governance architecture of FIG. 3 includes multiple levels, illustratively arranged in the form of a pyramid. More particularly, the value-based governance architecture in this embodiment includes five levels, starting with a Data Sources level as its lowest level and ending with an Action level as its highest level. The architecture in this embodiment further comprises additional levels including an Ingestion level, an Innovation level and a Consumable level. The levels are arranged from the lowest level to the highest level in order of increasing degree of value-based governance, from minimal governance at the Data Sources level to controlled governance at the Action level. As data is ingested from possibly raw forms at the lowest level of the hierarchy, each level of the hierarchy further transforms the data using additional processing and analysis thereby increasing the amount of value-based governance control over the data. Numerous other arrangements of upper, lower and intermediate levels may be used in other embodiments.

The lowest level of the hierarchical architecture in this embodiment is the Data Sources level which illustratively comprises various sources of raw data. For example, the data sources can include enterprise applications, systems, reports and numerous other sources. It is assumed that the Data Sources level provides low-level functions such as master data management (MDM) and other types of data management, as well as quality-related functions such as quality control and quality assurance.

The next level moving up the hierarchical architecture is the Ingestion level. This level is illustratively configured to ingest data assets into at least one data lake from data sources of the enterprise. Additionally or alternatively, data assets can be ingested from one or more external data sources into a data lake. This level illustratively provides functions such as source data classification and tagging. It is used to "stock the shelves" of the hierarchical value-based governance system 105. For example, the Ingestion level can utilize specific scripts and tools to automate the capturing of the technical metadata. The data lake into which the data assets are ingested illustratively comprises a business data lake or BDL of the enterprise, although additional or alternative ingestion arrangements can be used.

The next level of the hierarchical architecture is the Innovation level. This is an example of a function generation level. It supports discovery and exploration of the ingested data assets and creates searchable data assets for utilization by higher levels. For example, additional business metadata can be captured on the data assets from subject matter experts and stewards to enhance the searching capability.

The Innovation level is followed in the hierarchical architecture by the Consumable level. This level is an example of an analytical results model level. It is configured to facilitate utilization of the data assets in the analytics workspaces 122 by providing at least one of verification and trust assurance for the data assets in accordance with at least one analytical results model. For example, in this embodiment, the Consumable level creates verified, trusted, consumable data assets in accordance with an analytical results model. The analytical models can be scanned to capture the relational metadata to other assets such as formulas, functions, views, schemas and tables. The business metadata at this level can be captured to define the utilization of the analytical results model to promote reuse of the model.

The highest level of the hierarchical architecture in this embodiment is the Action level configured to generate analytics actions. For example, the analytics actions generated at the Action level may comprise one or more visualizations providing actionable insights into the corresponding data assets. The Action level continues to build both technical relational metadata to analytical models as well as business manual metadata providing actionable results from the visualization.

The hierarchical architecture illustrated in FIG. 3 utilizes integrated technical metadata and business metadata for data assets of the enterprise so as to provide traceability of the given data asset through the multiple levels of the architecture from a corresponding analytics action at the Action level back to its data source at the Data Source level.

A governance system implementing a hierarchical value-based architecture of the type illustrated in FIG. 3 can provide numerous advantageous features. For example, it can be used to assign responsibility within the enterprise for a given data asset, help identify and acquire insight for data sources, create and maintain consistent reference data and asset definitions enabling high levels of reusability across consumers, publishing relevant data to appropriate users, monitoring sources for data usage, relevancy and quality, create and manage meaningful business metadata to ensure it is discoverable and searchable by all user, resolve data integrity issues, perform root cause analysis and reconcile data issues, assign classifications such as personally identifiable information (PII), Sensitive, Regulatory or Federal, assign access tagging such as Enterprise, Confidential or Need to Know, provide a liaison between business and IT on data usability and accuracy in reporting and operations, and provide contextual results across all stakeholders minimizing reconciliation of multiple data points. These are just examples of features that may be present in one or more illustrative embodiments, and other embodiments can provide additional or alternative features.

The data asset catalog 108 collects and maintains the information gathered through the hierarchical value-based governance architecture implemented in the hierarchical value-based governance system 105. For example, the data asset catalog 108 is illustratively configured to store for each data asset information such as where the data asset is located, what it means, how it is related to other data assets and how it can be used to produce meaningful results in accordance with the hierarchical value-based governance architecture. All data assets of the enterprise may be cataloged in this manner, including data assets associated with diverse types of enterprise IT systems such as Hadoop, Greenplum, Business Intelligence, Data Warehousing & Reporting, Enterprise Resource Planning (ERP), Human Capital Management, MDM and numerous other types of enterprise systems.

Figure 4:
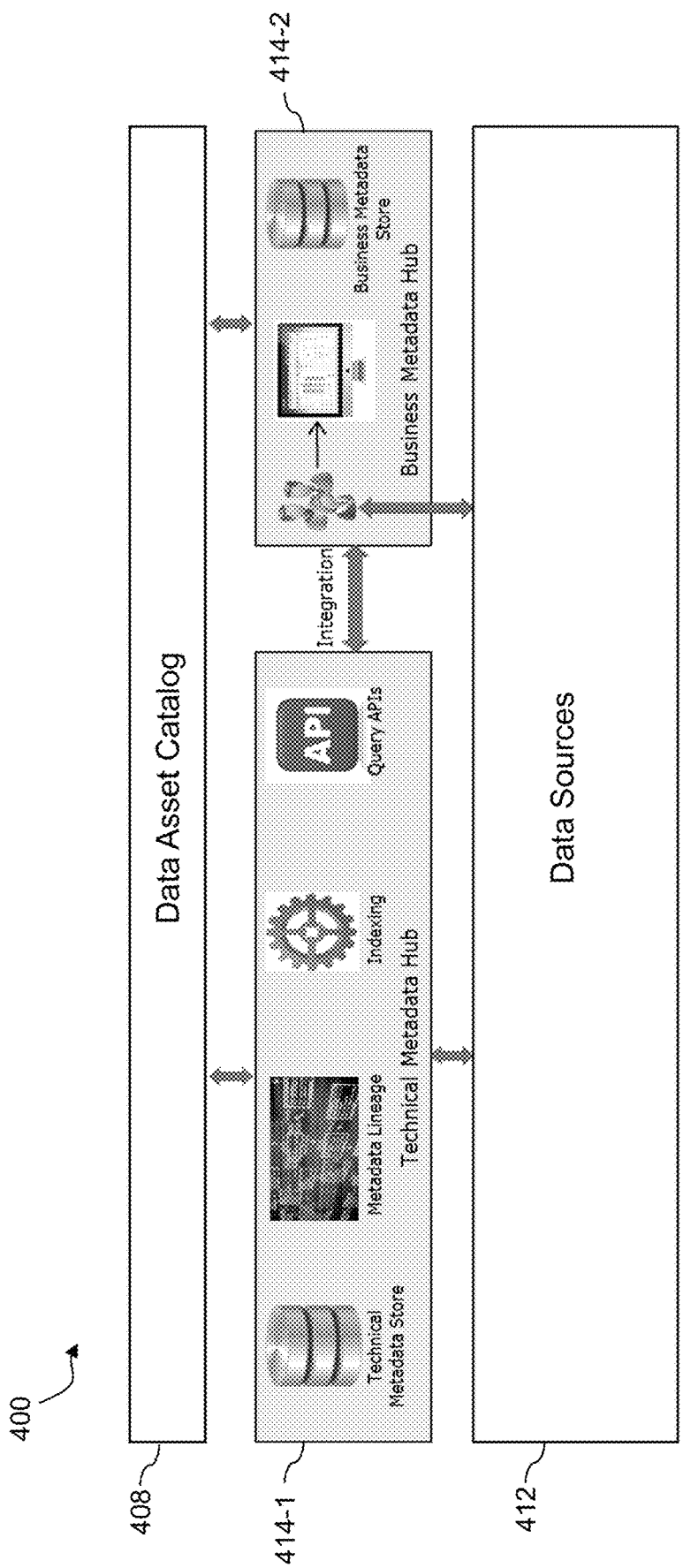
FIG. 4 shows another illustrative embodiment of an information processing system.

FIG. 4 shows another information processing system 400 in an illustrative embodiment. The information processing system 400 includes a data asset catalog 408, data sources 412, a technical metadata hub 414-1 and a business metadata hub 414-2. These elements may be configured in a manner similar to that described for corresponding elements 108, 112 and 114 of the FIG. 1 embodiment. In addition, the system 400 may include additional elements such as a data asset governance controller and an analytics platform of the type previously described in conjunction with FIG. 1.

In the FIG. 4 embodiment, the data sources 412 may include, for example, enterprise applications, systems and reports, but may include additional or alternative data sources. Such data sources for a given enterprise illustratively comprise all applications, systems or other sources of data assets within the enterprise. Data assets from the data sources are assumed to be ingested into at least one data lake such as a business data lake or BDL of the enterprise as previously described.

Accordingly, the data assets cataloged by the data asset catalog 408 in this embodiment illustratively comprise data ingested into a data lake of the enterprise, although other arrangements are possible.

For example, in some embodiments, it is possible that a data source could comprise a data lake itself, with the data lake containing information derived from other sources such as enterprise applications, systems and reports.

The technical metadata hub 414-1 comprises a technical metadata store. It further includes a metadata lineage module, an indexing module and a plurality of query APIs. At least portions of the technical metadata stored in the technical metadata store are obtained by automated scanning of the data assets. The technical metadata hub 414-1 captures and stores all technical metadata of the enterprise data assets. The metadata lineage information can be maintained in a separate module as illustrated or alternatively may be stored within the technical metadata store. The indexing module indexes the technical metadata so as to facilitate access to the technical metadata via the query APIs.

The technical metadata hub 414-1 is illustratively coupled to the business metadata hub 414-2 via an integration interface providing access to the query APIs of the technical metadata hub.

The business metadata hub 414-2 comprises a business metadata store. It further includes one or more user interfaces through which the hub interfaces with subject matter experts or other users. At least portions of the business metadata stored in the business metadata store are based at least in part on value-based data asset assessments received from corresponding data asset users via at least one user interface of the business metadata hub. The users may be associated with respective user devices that are not explicitly shown in the figure.

The business metadata hub 414-2 advantageously allows subject matter experts or other users associated with particular data assets to capture business metadata related to those data assets for use in value-based governance.

It should be noted that the term "hub" as used herein is intended to be broadly construed so as to encompass, for example, a centralized processing location for handling metadata of a particular type.

As mentioned previously, examples of technical metadata for a given one of the data assets comprise physical attributes of the given data asset such as location, creator, lineage and contents of the given data asset. Examples of business metadata for a given one of the data assets comprise semantic and logical attributes of the given data asset such as business definition, usage details, business controls and business owner of the given data asset. Numerous other types of technical and business metadata may be used.

More particularly, technical metadata in some embodiments comprises physical attributes of the data asset such as:

1. Where does the data asset reside?—Platform, System, Schema, Directory, etc.

2. Who created the data asset?—System, Individual User, etc.

3. How is the data asset related to other data assets?—Technical Lineage

4. What does the data asset contain?—Columns, Files, Text, etc.

Business metadata in some embodiments comprises semantic and logical attributes of the data asset such as:

1. What does the data asset mean?—Business definition of the data asset.

2. How can this data asset be used to produce meaningful results?—Usage details of the data asset.

3. What business controls exist over the data asset?—Confidential, Restricted, Critical Asset, etc.

4. Who owns the data asset from a business perspective?

Appendix 1 provides a more extensive listing of examples of technical and business metadata that may be used in a given embodiment. It is assumed for these examples that the technical metadata is obtained by scanning or other types of automated processes while the business metadata is obtained from a data steward, although other techniques for obtaining technical and business metadata can be used in other embodiments.

The data asset catalog 408 comprises information integrating technical metadata from the technical metadata hub 414-1 with business metadata from the business metadata hub 414-2 so as to facilitate value-based governance within the system 400.

The data asset catalog 408 illustratively utilizes a metadata model that incorporates both technical metadata and business metadata while also supporting specific sets of metadata attributes for different types of data assets. The data asset catalog 408 can provide information relating to all of the data assets of the enterprise.

Figure 5:
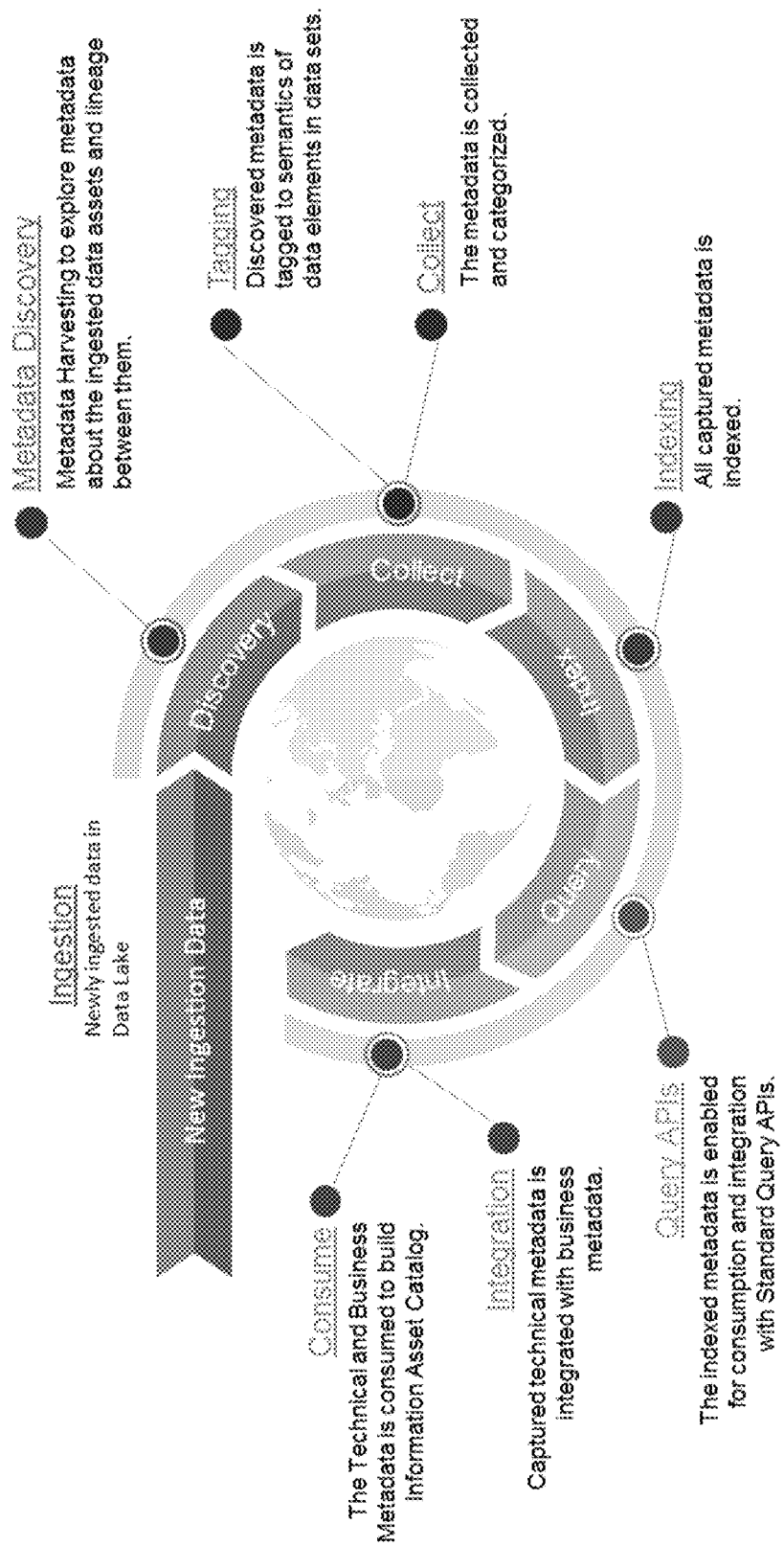
FIG. 5 illustrates multiple phases of a portion of a value-based governance process in an illustrative embodiment.

Referring now to FIG. 5, multiple phases of a portion of a value-based governance process are illustrated. This portion of the value-based governance process relates to generation and processing of technical and business metadata in the system 400 in order to generate the data asset catalog 408.

The phases illustrated in the figure include the following:

1. Ingestion. Data ingestion in this embodiment relates to ingesting data assets into the data lake for eventual consumption in analytics.

2. Metadata Discovery. Metadata discovery includes technical attributes to data assets providing searchable and meaningful fields for consumption.

3. Tagging & Collection. Tagging is collected and provides additional technical and business attributes to data assets improving the searching capability for stakeholder search.

4. Indexing. Indexing utilizes individual or multiple metadata fields to increase the performance of search capabilities by setting up key words as tokens.

5. Query APIs. The APIs provide a common way of consuming the collected and indexed metadata through standard interfaces.

6. Metadata Integration. Integration combines technical and business metadata as well as data lineage. Once the technical and business metadata as well as data lineage is integrated, stakeholders may trace applicable data assets. Metadata customized by data asset and data lineage can provide traceability from a visualization, to an analytical results model, and back to the data source.

7. Metadata Consumption. Stakeholders consume data assets to solve business problems and develop advanced analytics resulting in actionable tasks. Also, stakeholders identify and consume existing data assets reducing duplication for the creating of data assets accelerating resolution of business problems.

As mentioned previously, the hierarchical value-based governance functionality disclosed herein is illustratively used to generate governance workflows and processes. The workflows and processes reduce administration time, facilitate data asset accessibility and sharing, and provide the information marketplace framework for data teams to focus on analytics and solution visualization.

Figure 6:
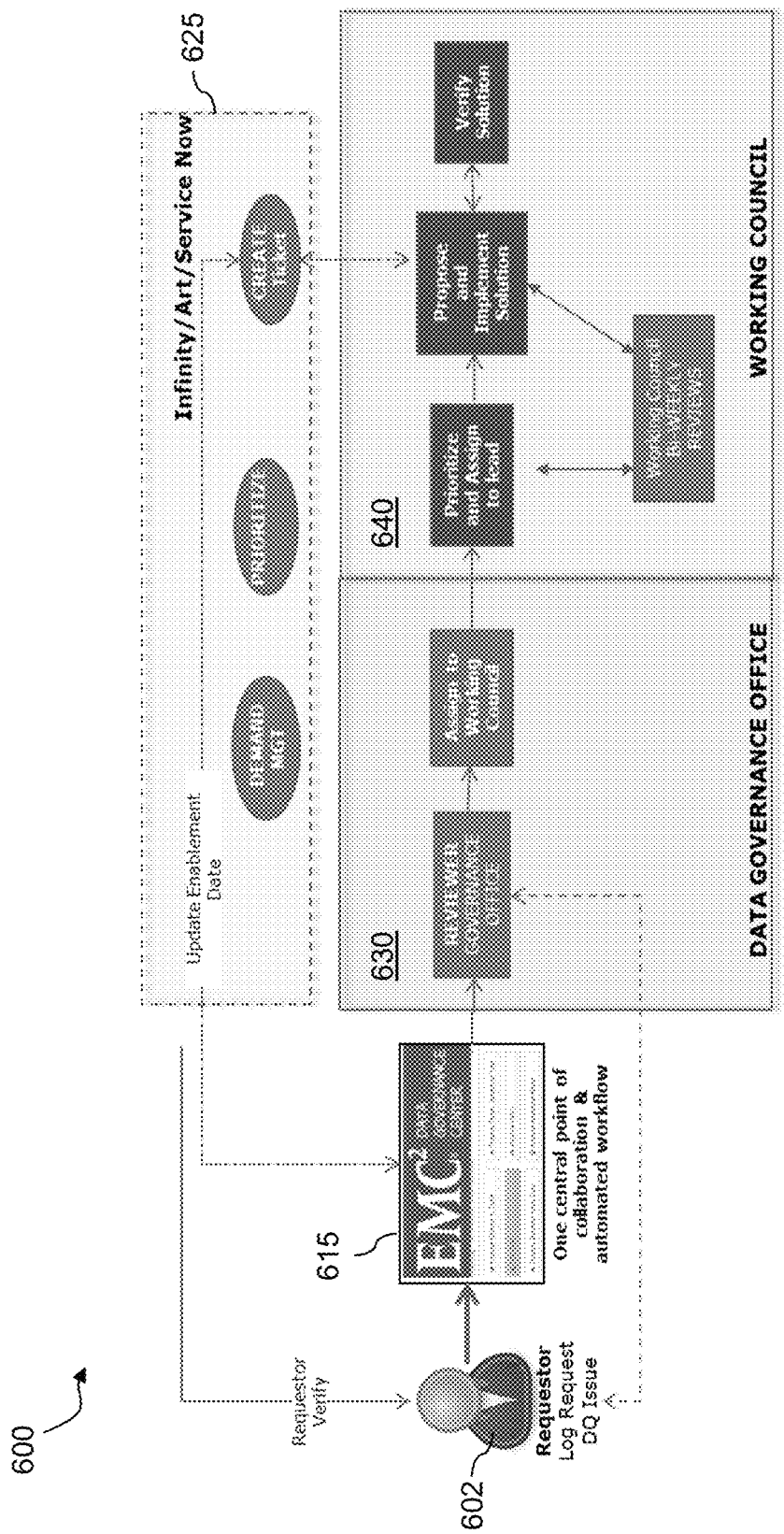
FIG. 6 shows an example of an integrated workflow generated utilizing a value-based governance architecture in an illustrative embodiment.

FIG. 6 shows an example of an integrated workflow generated utilizing a value-based governance architecture in an information processing system 600. More particularly, this figure illustrates an end-to-end integrated workflow from request to review to approval and provisioning across multiple teams from including business and IT teams. A requestor 602 interfaces with a central point of collaboration and automated workflow 615 illustratively provided by a hierarchical value-based governance system such as the system 105 previously described in conjunction with FIG. 1. Portions of the integrated workflow include processes 625, 630 and 640 that are at least in part configured to utilize visualizations or other analytics actions generated by the value-based governance system as described herein.

The embodiment of FIG. 6 is one example of a particular use case of a value-based governance system that delivers actionable governance through the adoption of automated workflows. This arrangement leverages a business process workflow with specific roles, voting rights and closed loop provisioning. At any point in this process, a corresponding user can view the status of the request including information such as the members of the working council that have voted for and approved the request.

These and other arrangements leveraging value-based governance can accelerate processes such as on-boarding, peer-to-peer reviews and dispute mitigation. Notifications can be sent via action e-mails, thereby allowing users to perform their respective roles from their business productivity tools. Automating data management activities with business productivity tools accelerates adoption, insight and accountability. Additionally or alternatively, these and other arrangements can eliminate the need for manual spreadsheet manipulation, automate guided notifications and status management, assign action accountability for creators and consumers of information as well as their respective roles, provide an organization structure to manage data, facilitates development of end-to-end business process models, allows self-service status management, provides change management capabilities, runs asynchronous tasks through workflows for efficiency, and provides automation that can be readily embedded in business productivity tools.

As another example of a use case for hierarchical value-based governance as disclosed herein, consider analytics relating to total customer experience (TCE) for a particular product sold by an enterprise, such as disk drives. Such a TCE disk drive analytics process leverages a hierarchical value-based governance architecture that integrates automated technical metadata and business metadata maintained by data stewards. It provides data asset traceability from visualization to data source.

In this example, a given data visualization at the highest level of the hierarchy ("Action") may be TCE disk drive reliability. Metadata attributes are applied via automation and business insight. Modification to attributes is dynamic. There are one or more corresponding analytical results models at the Consumable level of the hierarchy that provide results foundations for the visualization. The analytical results models are illustratively created by technical tools from the Innovation level leveraging data assets from the Ingestion level. The analytical results models may additionally be configured to represent the inputs of business subject matter experts and technical analysts.

At the Innovation level of the hierarchy, functions are generated comprising technical code that utilizes Ingestion level assets as inputs and Consumable level assets as outputs. There may be many-to-many relationships between Innovation, Consumable and Ingestion level types. Relationship visualizations are applied to understand interdependencies. The functions of the Innovation level can utilize one or more base tables. Base table metadata is illustratively automated into the system. Data stewards may be used to manage relationships between governance hierarchy levels.

At the Ingestion level of the hierarchy, raw data is ingested into the data lake and further processed so as to be available for use in generating functions at the Innovation level. Automated metadata scanning captures key attribute information and business experts provide key domain expertise.

Visual topological relationships may be constructed at the Action level by coalescing metadata and other information within the hierarchical value-based governance architecture. For example, such visualizations can identify key areas of dependencies between levels of governance and provides a holistic view of governed data assets.

It is to be appreciated that the particular uses cases and associated features described above are examples only, and should not be construed as limiting in any way.

As indicated elsewhere herein, illustrative embodiments can provide a number of significant advantages relative to conventional arrangements.

For example, these embodiments can provide a paradigm shift in the way businesses, organizations and other enterprises look at their data assets and extract valuable insights out of those data assets.

These embodiments advantageously provide an innovative way of managing an enterprise information marketplace. Through the combination of a scalable metadata architecture and optimized governance workflows and processes, a given embodiment can provide value-based governance that promotes collaboration and accelerate insights to action for Big Data analytics and other types of advanced analytics.

Illustrative embodiments efficiently value and organize data while implementing a support framework reducing discovery, approval and provisioning time to access data assets and perform analytics actions.

Illustrative embodiments can be utilized to support analytics workspaces in a wide variety of different use cases and verticals, thereby facilitating the extraction of useful insights from enterprise data assets in diverse analytics scenarios.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail in conjunction with FIGS. 7 and 8. Although described primarily in the context of information processing system 100, these platforms may also be used to implement at least portions of other information processing systems in other embodiments of the invention.

Figure 7:
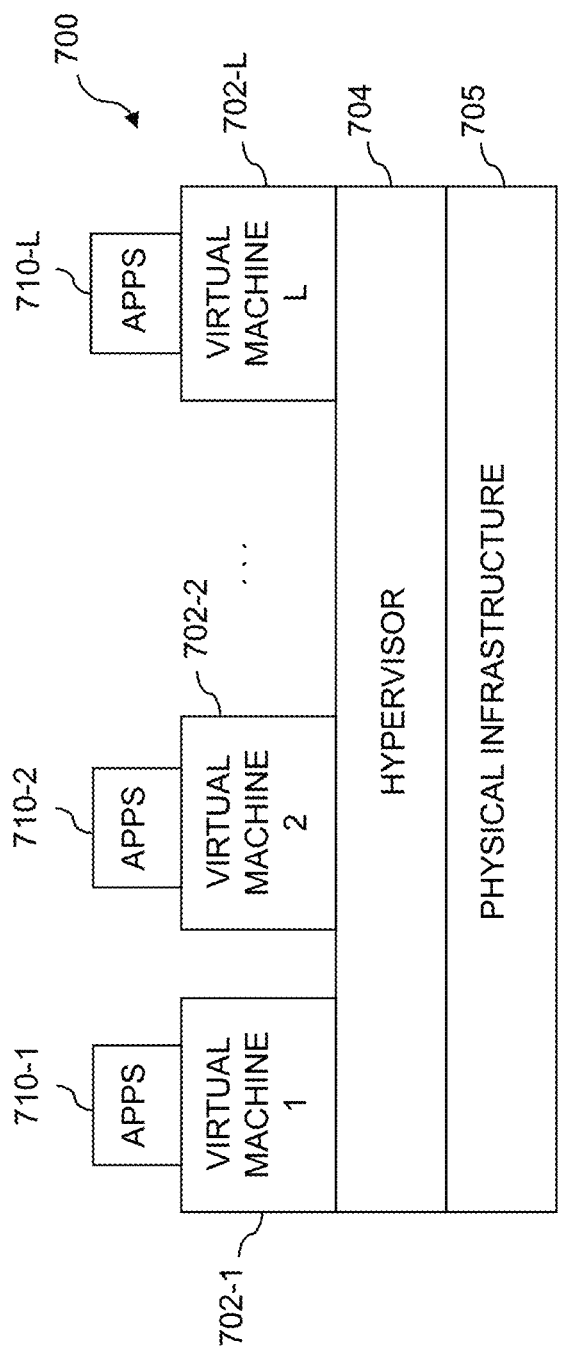
FIGS. 7 and 8 show examples of processing platforms that may be utilized to implement at least a portion of an information processing system in illustrative embodiments.
Figure 8:
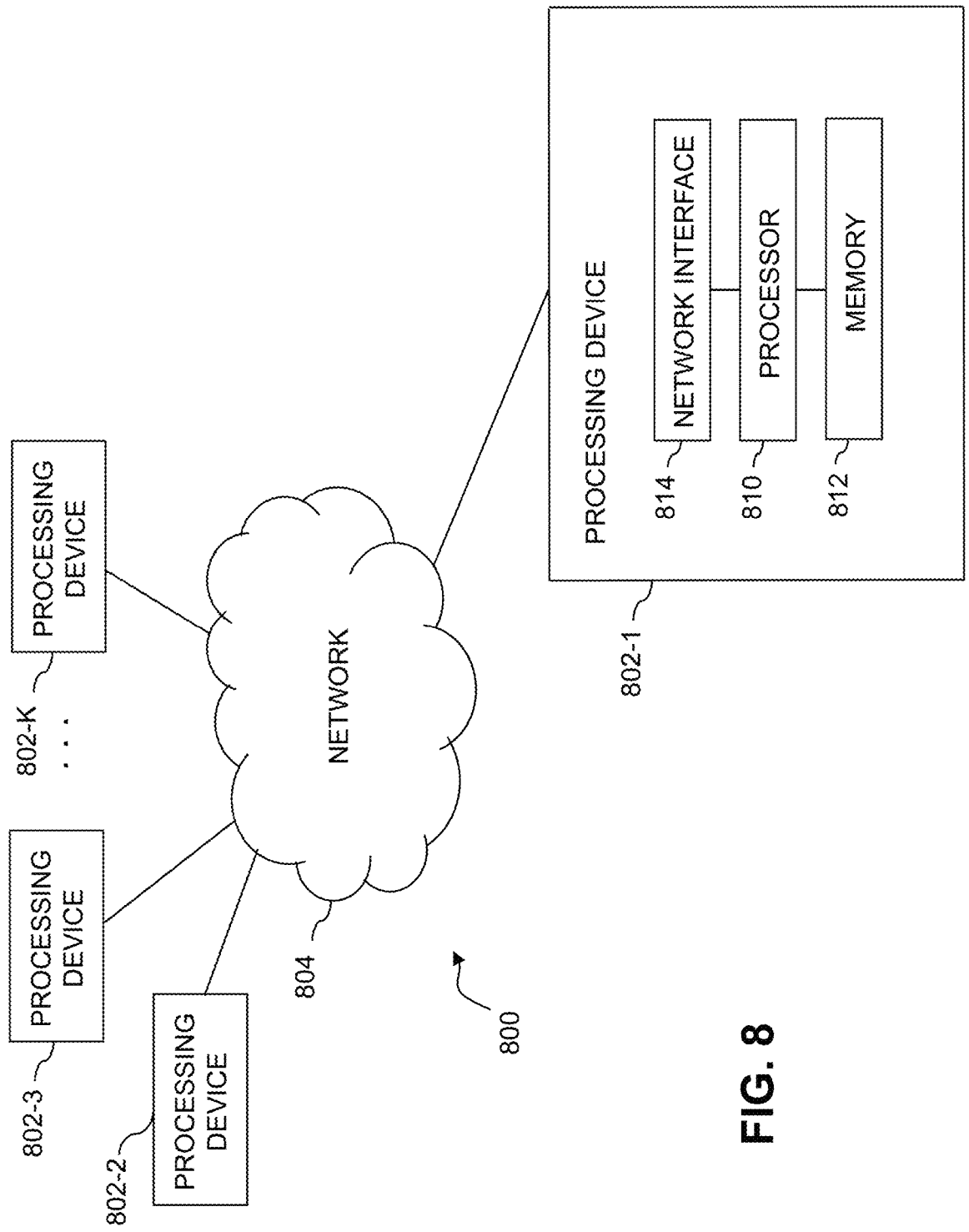

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

These and other types of cloud infrastructure can be used to implement one or more system components, such as hierarchical value-based governance system 105, analytics platform 120, or combinations or portions thereof, in a given embodiment.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 704 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of a data asset governance controller, data asset catalog, technical metadata hub, business metadata hub or other component of a hierarchical value-based governance system are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, value-based governance systems, analytics platforms, analytics workspaces and other components. Also, the particular configurations of system and device elements, associated processing operations and other value-based governance functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

APPENDIX 1

Examples of Technical and Business Metadata for Value-Based Governance

A. Ingestion—Base tables to capture columns related to tables
   a. Metadata attributes
      i. Description of the table**
      ii. Location to the table*
      iii. Refresh rate*
      iv. Security classification**
      v. Date of creation*
      vi. Logical data type (e.g. Finance, Eng)**
      vii. Table type (table, results table)*
      viii. Support type (IT, Innovation)*
      ix. Usage approval requirement**
      x. Last cataloged date*
      xi. Physical asset owner**
      xii. Contains sensitive data**
      xiii. Asset status*
   b. Metadata related
      i. Table contains column*
      ii. Results table is produced by ARM**
      iii. Base table is used by function**
      iv. Base table is parsed by parser**
      v. Table is part of workspace*
      vi. Table has a system of reference of system*
      vii. Table has a system of record of system*
      viii. Table is part of schema*

B. Innovation—Functions created and related to tables
   a. Metadata attributes
      i. Description of the Function**
      ii. Location to the function code*
      iii. Refresh rate*
      iv. Date of creation**
      v. Date of enablement**
      vi. Descriptive example**
      vii. Version**
      viii. Table name for output*
      ix. Asset status*
   b. Metadata related
      i. Function creates Analytical Model*
      ii. Function to platform*
      iii. Function uses base tables*
      iv. Function parses column*
      v. Function uses view*

C. Consumable—Analytical Results Model (ARM) creates results table
   a. Metadata attributes
      i. Description of the ARM**
      ii. Location to the results table*
      iii. Refresh rate*
      iv. Security classification**
      v. Date of creation*
      vi. Logical data type (e.g. Finance, Eng)**
      vii. Table type (table, results table)*
      viii. Support type (IT, Innovation)*
      ix. Usage approval requirement**
      x. Business filters**
      xi. Contains sensitive data**
      xii. Asset status*
   b. Metadata related
      i. Table contains column*
      ii. Results table is produced by ARM*
      iii. Base table is used by function*
      iv. Base table is parsed by parser*
      v. Table is part of workspace*
      vi. Table has a system of reference of system*
      vii. Table has a system of record of system*

D. Action—visualization is a Tableau report linked to the analytical model
   a. Metadata attributes
      i. Description of the report**
      ii. Location link to the actual Tableau report*
      iii. Status of the visualization**
      iv. Last modified date*
      v. Last refresh*
      vi. Contains sensitive data**
      vii. Revenue generating**
      viii. Customer Facing**
   b. Metadata related
      i. Tool creates Data Visualization*
      ii. Data Visualization uses Table*
      iii. Data Visualization uses View*

*=Technical metadata populated by automation/scanning
**=Business metadata maintained by steward

What is claimed is:

1. An apparatus comprising:
at least one processing platform accessible to a plurality of user devices over at least one network;
wherein the processing platform implements a hierarchical value-based governance system for data assets of an enterprise;
the hierarchical value-based governance system comprising:
a data asset governance controller;
a technical metadata hub;
a business metadata hub; and
a data asset catalog coupled to the technical metadata hub and the business metadata hub and providing integrated technical metadata and business metadata for each of a plurality of the data assets of the enterprise;
the data asset governance controller being configured to generate analytics actions for one or more analytics workspaces based at least in part on the integrated technical metadata and business metadata of the data asset catalog;
wherein the one or more analytics workspaces are part of at least one analytics platform that is separate from the hierarchical value-based governance system;
wherein the hierarchical value-based governance system comprises a multi-level hierarchical architecture having at a lower level of the hierarchical architecture an ingestion level configured to ingest data assets from data sources of the enterprise and at an upper level of the hierarchical architecture an action level configured to generate the analytics actions;
wherein the multi-level hierarchical architecture further comprises one or more intermediate levels including at least one of a function generation level and an analytical results model level; and wherein the processing platform is implemented by one or more processing devices each comprising a processor coupled to a memory.

2. The apparatus of claim 1 wherein the technical metadata hub comprises a technical metadata store and the business metadata hub comprises a business metadata store.

3. The apparatus of claim 1 wherein at least portions of the technical metadata are obtained by automated scanning of the data assets.

4. The apparatus of claim 1 wherein at least portions of the business metadata are based at least in part on value-based data asset assessments received from corresponding data asset users associated with respective ones of the user devices via at least one user interface of the business metadata hub.

5. The apparatus of claim 1 wherein the technical metadata hub is coupled to the business metadata hub via an integration interface providing access to one or more query application programming interfaces of the technical metadata hub.

6. The apparatus of claim 1 wherein the data assets comprise data ingested into a data lake of the enterprise.

7. The apparatus of claim 1 wherein the technical metadata for a given one of the data assets comprises physical attributes of the given data asset including location, creator, lineage and contents of the given data asset.

8. The apparatus of claim 1 wherein the business metadata for a given one of the data assets comprises semantic and logical attributes of the given data asset including business definition, usage details, business controls and business owner of the given data asset.

9. The apparatus of claim 1 wherein the analytical results model level is configured to facilitate utilization of the data assets in the analytics workspaces by providing at least one of verification and trust assurance for the data assets in accordance with at least one analytical results model.

10. The apparatus of claim 1 wherein the analytics actions generated by the data asset governance controller comprise one or more visualizations providing actionable insights into the corresponding data assets.

11. The apparatus of claim 1 wherein the integrated technical metadata and business metadata for a given one of the data assets of the enterprise provides traceability of the given data asset through multiple levels of the hierarchical architecture of the hierarchical value-based governance system from a corresponding analytics action at an upper one of the levels back to its data source at a lower one of the levels.

12. The apparatus of claim 1 wherein the hierarchical value-based governance system is configured to increase an amount of value-based governance control of the data assets from the lower level of the hierarchical architecture to the upper level of the hierarchical architecture via processing and analysis operations implemented at a plurality of the levels of the hierarchical architecture.

13. A method comprising:

implementing a hierarchical value-based governance system;

receiving technical metadata and business metadata relating to data assets of an enterprise;

configuring a data asset catalog within the hierarchical value-based governance system to provide integrated technical metadata and business metadata for each of a plurality of the data assets of the enterprise; and generating analytics actions for one or more analytics workspaces based at least in part on the integrated technical metadata and business metadata of the data asset catalog;

wherein the one or more analytics workspaces are part of at least one analytics platform that is separate from the hierarchical value-based governance system;

wherein the hierarchical value-based governance system comprises a multi-level hierarchical architecture having at a lower level of the hierarchical architecture an ingestion level configured to ingest data assets into at least one data lake of the enterprise and at an upper level of the hierarchical architecture an action level configured to generate the analytics actions;

wherein the multi-level hierarchical architecture further comprises one or more intermediate levels including at least one of a function generation level and an analytical results model level; and wherein the method is performed by one or more processing devices each comprising a processor coupled to a memory.

14. The method of claim 13 wherein at least portions of the business metadata are based at least in part on value-based data asset assessments received from corresponding data asset users.

15. The method of claim 13 further including increasing an amount of value-based governance control of the data assets from the lower level of the hierarchical architecture to the upper level of the hierarchical architecture via processing and analysis operations implemented at a plurality of the levels of the hierarchical architecture.

16. The method of claim 13 wherein the integrated technical metadata and business metadata for a given one of the data assets of the enterprise provides traceability of the given data asset through multiple levels of the hierarchical architecture of the hierarchical value-based governance system from a corresponding analytics action at an upper one of the levels back to its data source at a lower one of the levels.

17. A computer program product comprising a non-transitory processor-readable storage medium having stored therein program code of one or more software programs, wherein the program code when executed by at least one processing device causes the at least one processing device:

to implement a hierarchical value-based governance system;

to receive technical metadata and business metadata relating to data assets of an enterprise;

to configure a data asset catalog within the hierarchical value-based governance system to provide integrated technical metadata and business metadata for each of a plurality of the data assets of the enterprise; and to generate analytics actions for one or more analytics workspaces based at least in part on the integrated technical metadata and business metadata of the data asset catalog;

wherein the one or more analytics workspaces are part of at least one analytics platform that is separate from the hierarchical value-based governance system;

wherein the hierarchical value-based governance system comprises a multi-level hierarchical architecture having at a lower level of the hierarchical architecture an ingestion level configured to ingest data assets into at least one data lake of the enterprise and at an upper level of the hierarchical architecture an action level configured to generate the analytics actions; and wherein the multi-level hierarchical architecture further comprises one or more intermediate levels including at least one of a function generation level and an analytical results model level.

18. The computer program product of claim 17 wherein at least portions of the business metadata are based at least in part on value-based data asset assessments received from corresponding data asset users.

19. The computer program product of claim 17 wherein the integrated technical metadata and business metadata for a given one of the data assets of the enterprise provides traceability of the given data asset through multiple levels of the hierarchical architecture of the hierarchical value-based governance system from a corresponding analytics action at an upper one of the levels back to its data source at a lower one of the levels.

20. The computer program product of claim 17 wherein the program code when executed by the at least one processing device causes the at least one processing device: to increase an amount of value-based governance control of the data assets from the lower level of the hierarchical architecture to the upper level of the hierarchical architecture via processing and analysis operations implemented at a plurality of the levels of the hierarchical architecture.

* * * * *